US012358125B2

(12) United States Patent
Perlenfein

(10) Patent No.: US 12,358,125 B2
(45) Date of Patent: Jul. 15, 2025

(54) TEMPLATE FOR FORMING FAUCET ASSEMBLY HOLES IN A COUNTERTOP

(71) Applicant: Devon James Perlenfein, New Albany, OH (US)

(72) Inventor: Devon James Perlenfein, New Albany, OH (US)

( * ) Notice: Subject to any disclaimer, the term of this patent is extended or adjusted under 35 U.S.C. 154(b) by 382 days.

(21) Appl. No.: 18/117,216

(22) Filed: Mar. 3, 2023

(65) Prior Publication Data

US 2023/0294272 A1 Sep. 21, 2023

Related U.S. Application Data

(60) Provisional application No. 63/320,363, filed on Mar. 16, 2022.

(51) Int. Cl.
*G01B 5/14* (2006.01)
*B25H 7/00* (2006.01)
*E03C 1/04* (2006.01)

(52) U.S. Cl.
CPC ........... *B25H 7/005* (2013.01); *E03C 1/0401* (2013.01); *G01B 5/143* (2013.01)

(58) Field of Classification Search
CPC ........ B25H 7/005; E03C 1/0401; G01B 5/143
USPC ..................................... 33/562, 563
See application file for complete search history.

(56) References Cited

U.S. PATENT DOCUMENTS

| | | | |
|---|---|---|---|
| 2,029,650 A | 2/1936 | Betz | |
| 2,548,197 A | 4/1951 | Conner | |
| 4,177,569 A | 12/1979 | Greer | |
| 4,574,492 A * | 3/1986 | Miller | B43L 7/14 |
| | | | 33/476 |
| 4,603,717 A * | 8/1986 | Thomas | B27F 1/12 |
| | | | 33/562 |
| 5,181,809 A * | 1/1993 | Martin | G05B 19/4015 |
| | | | 33/562 |
| 5,375,272 A * | 12/1994 | Mikol | E03C 1/0402 |
| | | | 137/359 |
| 5,390,422 A | 2/1995 | Hill | |
| 5,392,524 A | 2/1995 | Hill | |
| 5,682,934 A * | 11/1997 | Rybski | B23Q 9/0085 |
| | | | 144/144.1 |
| 5,848,478 A | 12/1998 | Duncan | |
| 6,077,000 A * | 6/2000 | Gibbons | B25H 7/02 |
| | | | 33/645 |

(Continued)

FOREIGN PATENT DOCUMENTS

GB 575360 A 2/1946

*Primary Examiner* — George B Bennett
(74) *Attorney, Agent, or Firm* — Dickinson Wright PLLC

(57) ABSTRACT

A template for assisting in drilling holes in a countertop adjacent to a sink during a water faucet installation process. The template includes at least one plate segment. A bottom surface of the plate segment is configured to overly the countertop. A top surface of the plate segment defines at least one guide bore for guiding a rotary device during the formation of the hole. A drop flange extends downwardly from a front side of the at least one plate segment for engaging an edge of the countertop along the sink. The drop flange is spaced from a center of the at least one guide bore by a first distance in order to allow the hole to be drilled through the countertop along the at least one guide bore at the first distance away from the edge of the countertop.

20 Claims, 9 Drawing Sheets

(56) References Cited

U.S. PATENT DOCUMENTS

| | | | |
|---|---|---|---|
| 6,267,136 B1* | 7/2001 | Johnson | E03C 1/0401 |
| | | | 137/359 |
| 6,293,322 B1 | 9/2001 | Wilson-South | |
| 7,007,317 B1 | 3/2006 | Brown | |
| 7,039,966 B1* | 5/2006 | Cranston, Jr. | E03C 1/0401 |
| | | | 4/695 |
| 7,214,008 B1 | 5/2007 | Dods et al. | |
| 7,591,076 B2* | 9/2009 | Varnedoe | B23K 37/0443 |
| | | | 33/562 |
| 8,667,701 B1* | 3/2014 | Geesaman | B25H 7/02 |
| | | | 33/562 |
| 10,035,257 B2* | 7/2018 | Darby | B25H 7/005 |
| 11,246,222 B2* | 2/2022 | Jara Rodelgo | G01B 5/0025 |
| 12,264,465 B1* | 4/2025 | Chen | E03C 1/0402 |
| 2005/0084344 A1 | 4/2005 | Dods et al. | |
| 2009/0317200 A1 | 12/2009 | Brunter | |
| 2015/0343628 A1 | 12/2015 | Moreland | |
| 2020/0039177 A1* | 2/2020 | Reddy | B32B 3/266 |
| 2024/0418494 A1* | 12/2024 | Lucas | B43L 7/005 |

* cited by examiner

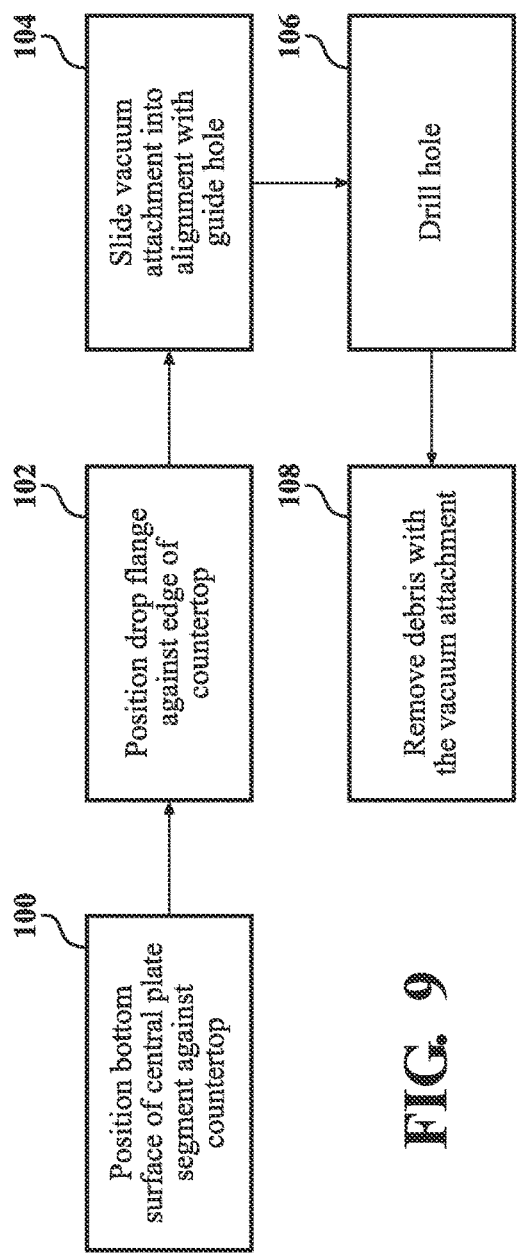
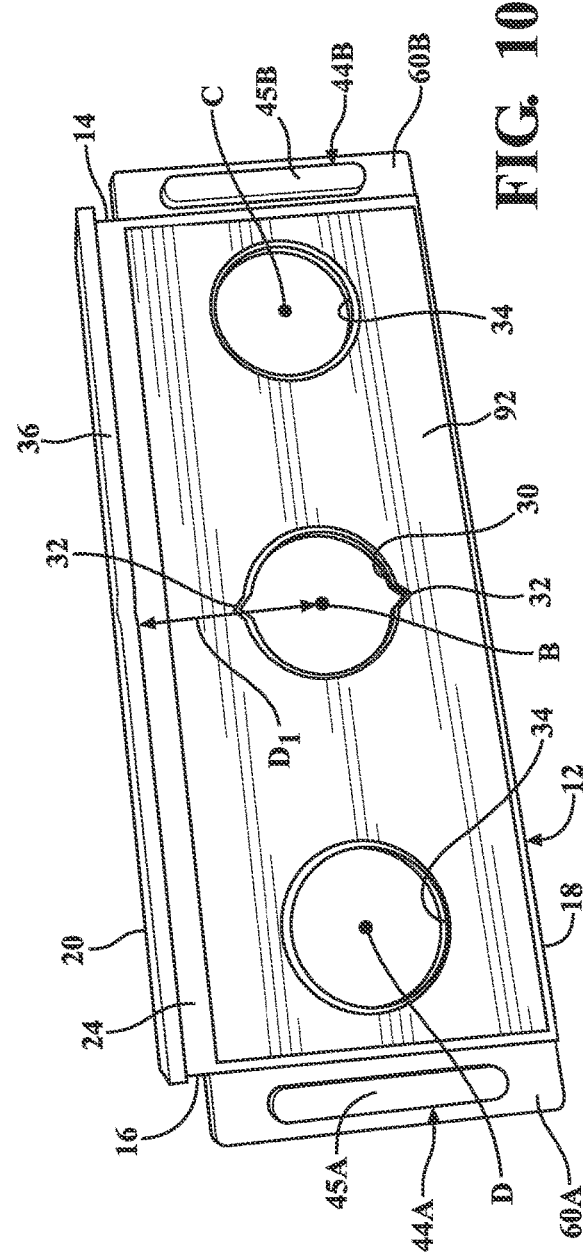

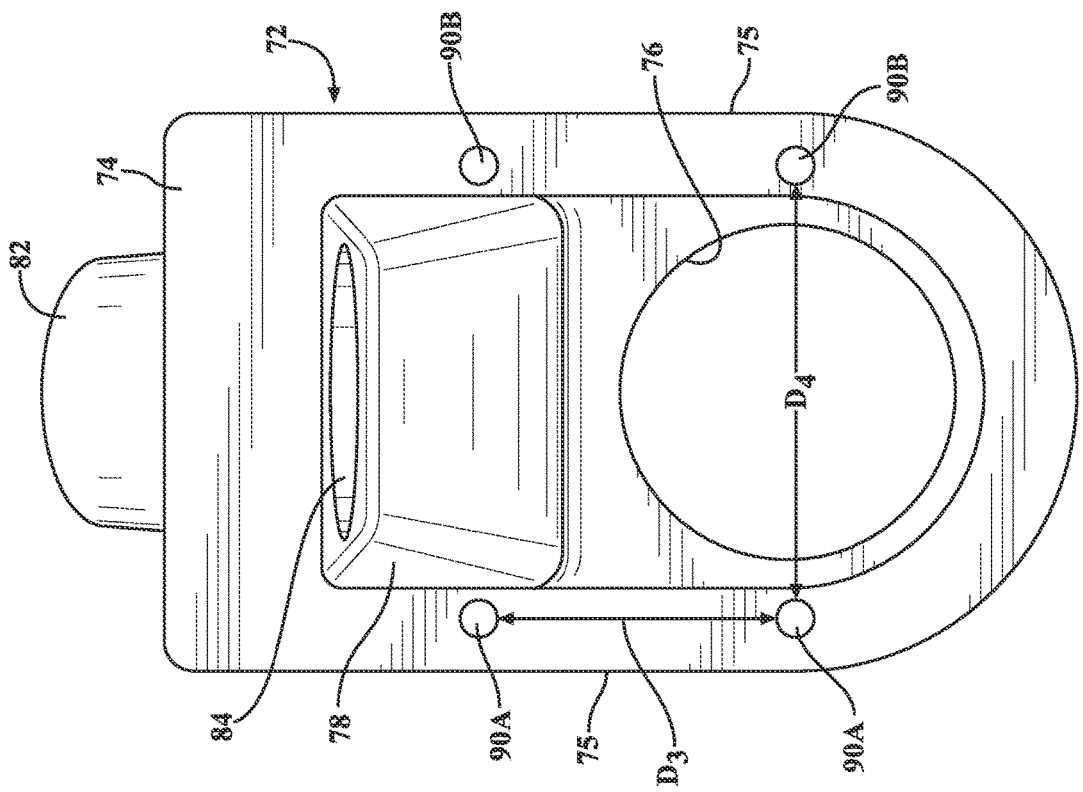
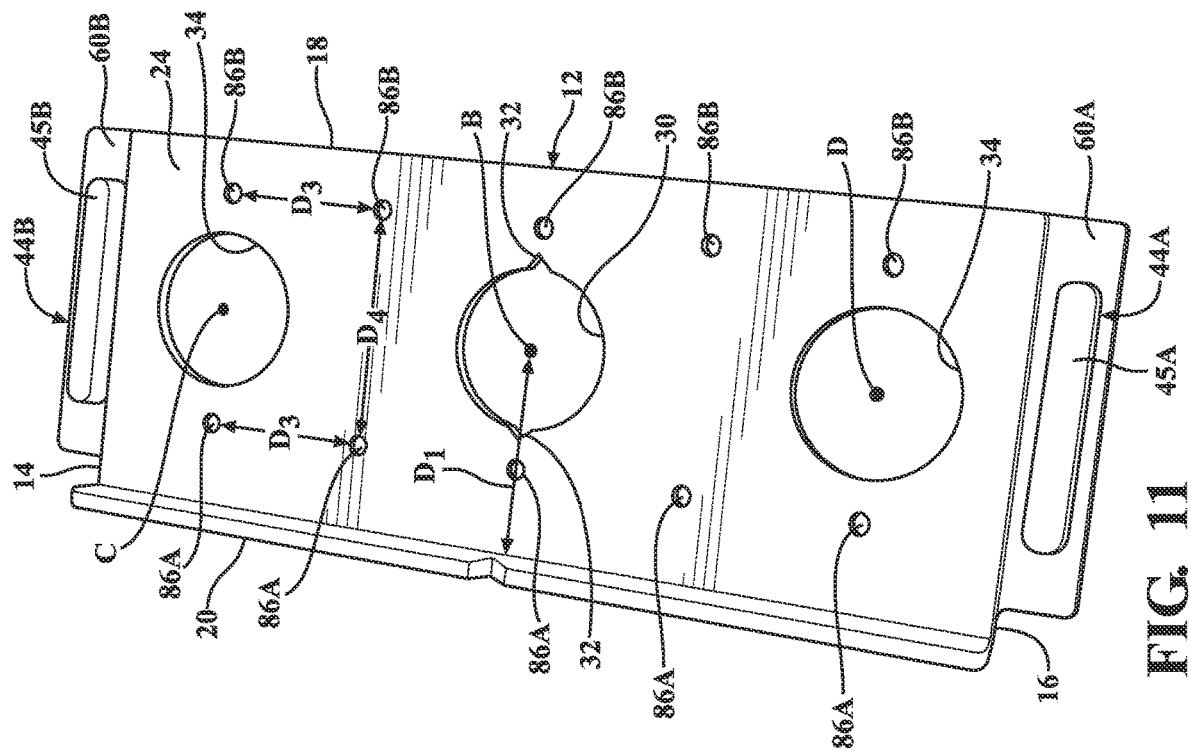

TEMPLATE FOR FORMING FAUCET ASSEMBLY HOLES IN A COUNTERTOP

CROSS-REFERENCES TO RELATED APPLICATIONS

This patent application claims priority to U.S. Provisional Patent Application Ser. No. 63/320,363, filed on Mar. 16, 2022, which is incorporated herein by reference in its entirety.

FIELD OF THE DISCLOSURE

The present disclosure relates to faucet assembly installations. More particularly, the present disclosure relates to a template used for assisting a tradesperson in locating and drilling holes in a countertop for receiving faucet assembly components.

BACKGROUND OF THE DISCLOSURE

This section provides background information related to the present disclosure which is not necessarily prior art.

It is common for faucet assembly components such as faucets, handles, soap dispensers and drinking water dispensers to be received and mounted in countertop holes adjacent to a sink. A typical faucet assembly installation processes involves a tradesperson manually measuring a centerline, setback and spacing of hole locations, and marking the hole locations for subsequent drilling along the markings. This measuring process is complex and has a large margin for error. After marking the hole locations, the process relies on the tradesperson to have a steady hand to initiate contact with a drilling tool—often a diamond tipped hole saw with a center pilot bit driven by a right angle grinding tool, initiated at an acute angle. When contact is initially made with the countertop, the bit typically rotates at 10,000 RPMs or more, which can lead to movement of the bit across the countertop surface and cause undesired damage. After initial contact, a steady hand is required to stand the drilling tool perpendicularly to the surface to continue drilling. This process naturally creates a significant amount of dust and debris, which is typically contained by a vacuum held close to the drill by a second tradesperson—thus rending the process a two person job.

There remains a need for improvements to such faucet assembly installation processes.

SUMMARY OF THE DISCLOSURE

This section provides a general summary of the disclosure and is not intended to be interpreted as a comprehensive listing of its full scope or of all of its objects, aspects, features and/or advantages.

According to an aspect of the disclosure, a template is provided for assisting in drilling holes in a countertop adjacent to a sink during a water faucet assembly installation process. The template includes at least one plate segment that extends along an axis and has a front side and a rear side opposite the front side, and a top surface and a bottom surface opposite the top surface. The bottom surface is configured to overlie the countertop. The top surface of the at least one plate segment defines at least one guide bore for guiding a rotary device during the formation of a hole in the countertop. A drop flange extends downwardly from the front side of the at least one plate segment for engaging an edge of the countertop in the sink. The drop flange is spaced from a center of the at least one guide bore in a front-to-back direction between the sides by a first distance in order to allow the hole to be drilled through the countertop along the at least one guide bore at the first distance away from the edge of the countertop.

According to another aspect of the disclosure, a method is provided for drilling at least one hole in a countertop adjacent to a sink during a water faucet installation process. The method includes providing at least one plate segment extending along an axis and having a front side and a rear side opposite the front side, and a top surface and a bottom surface opposite the top surface. The top surface of the at least one plate segment defines at least one guide bore. A drop flange extends downwardly from the front side. The drop flange is spaced from a center of the at least one guide bore in a front-to-back direction between the sides by a first distance. The method further includes positioning the bottom surface of the at least one plate segment over the countertop. The method also includes positioning the drop flange against an edge of the countertop in the sink such that a center of the at least one guide bore overlies the countertop at the first distance from the edge of the countertop in the sink. The method also includes drilling a hole through the countertop with a rotary tool through the at least one guide bore.

The template and associated method save time and reduce a margin for error during the process of measuring hole locations and drilling in that the template allows the tradesperson to quickly and repeatedly align, mark and drill holes without the use of a separate measuring instrument. The template and method also reduce a risk of damaging the countertop surface by offering a layer of protection around the rotary tool during drilling.

The template is also simple in design and has a relatively low manufacturing cost with few moving parts, a small physical size, and the ability to be manufactured in a variety of materials including, but not limited to plastic, aluminum and steel.

According to another aspect of the disclosure, the template includes a vacuum attachment which connects to, and is moveable along the at least one plate segment for removing debris during drilling. The vacuum attachment advantageously allows debris to be removed by a single tradesperson without requiring the assistance of another.

DRAWINGS

The drawings described herein are for illustrative purposes only of selected embodiments and not all possible implementations thereof such that the drawings are not intended to limit the scope of the present disclosure.

FIG. 9 is a flow diagram illustrating an example method of using a template;

FIG. 10 is a perspective bottom view of a central plate segment of a template, illustrating an arrangement of a pad along a bottom surface of the central plate segment for inhibiting movement of the central plate segment;

FIG. 11 is a perspective bottom view of the central plate segment of the template of FIG. 10 without the pad, illustrating an arrangement of embedded magnets along a bottom surface of the central plate segment for biasing a vacuum attachment into predetermined positions;

Figure 13:
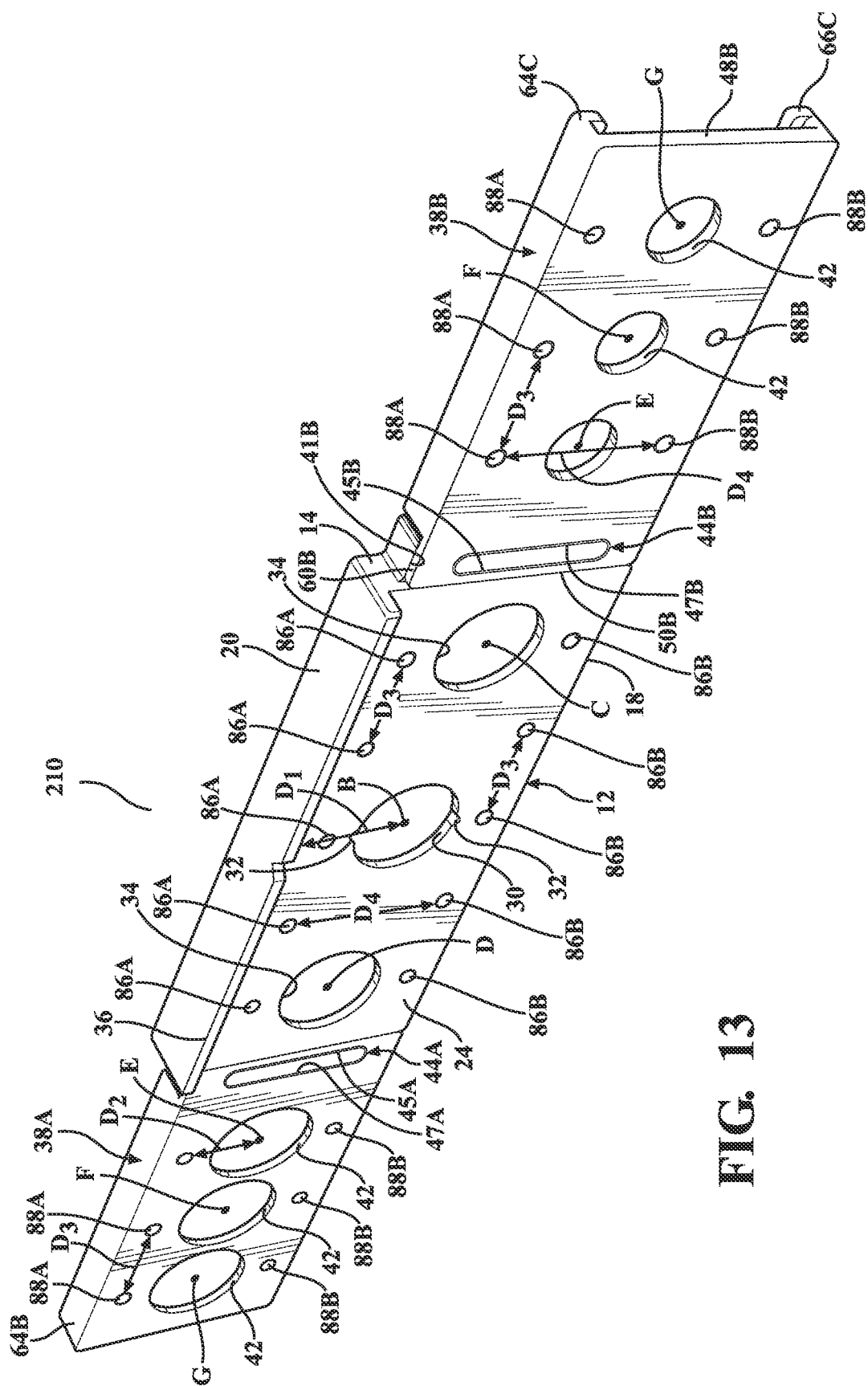

FIG. 12 is a bottom view of a vacuum attachment, illustrating an arrangement of embedded magnets along a bottom surface of the vacuum attachment for biasing the vacuum attachment into predetermined positions; and FIG. 13 is bottom perspective view of the template of FIG. 10, illustrating an arrangement of embedded magnets along a bottom surface of central and supplementary plate segments of the template.

DETAILED DESCRIPTION OF THE EXAMPLE EMBODIMENTS

Example embodiments of a template 10 for assisting tradespeople in drilling holes in a countertop 11 adjacent to a sink 13 during a water faucet assembly installation process embodying the teachings of the present disclosure will now be described more fully with reference to the accompanying drawings. However, the example embodiments are only provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that the example embodiments may be embodied in many different forms that may be combined in various ways, and that neither should be construed to limit the scope of the disclosure. In some example embodiments, well-known processes, well-known device structures, and well-known technologies are not described in detail.

More particularly, referring to the figures, wherein like numerals indicate corresponding parts throughout the several views, the template 10, 110, 210 is generally shown. With references to FIG. 1, the template 10, 110, 210 is used for assisting tradespeople in drilling holes in a countertop 11 adjacent to a sink 13 during a water faucet assembly installation process. The template 10, 110, 210 may be used to assist in drilling holes for various faucet assembly components, including, but not limited to, faucets, handles, soap dispensers and water dispensers.

All of the features of the template 10, 110, 210 discussed herein may be made of a variety of materials including, but not limited to, plastic, aluminum and steel, the template 10, 110, 210 includes few moving parts and has a relatively small overall physical size. This allows the template 10, 110, 210 to be manufactured in a low cost, repeatable manner.

Figure 1:
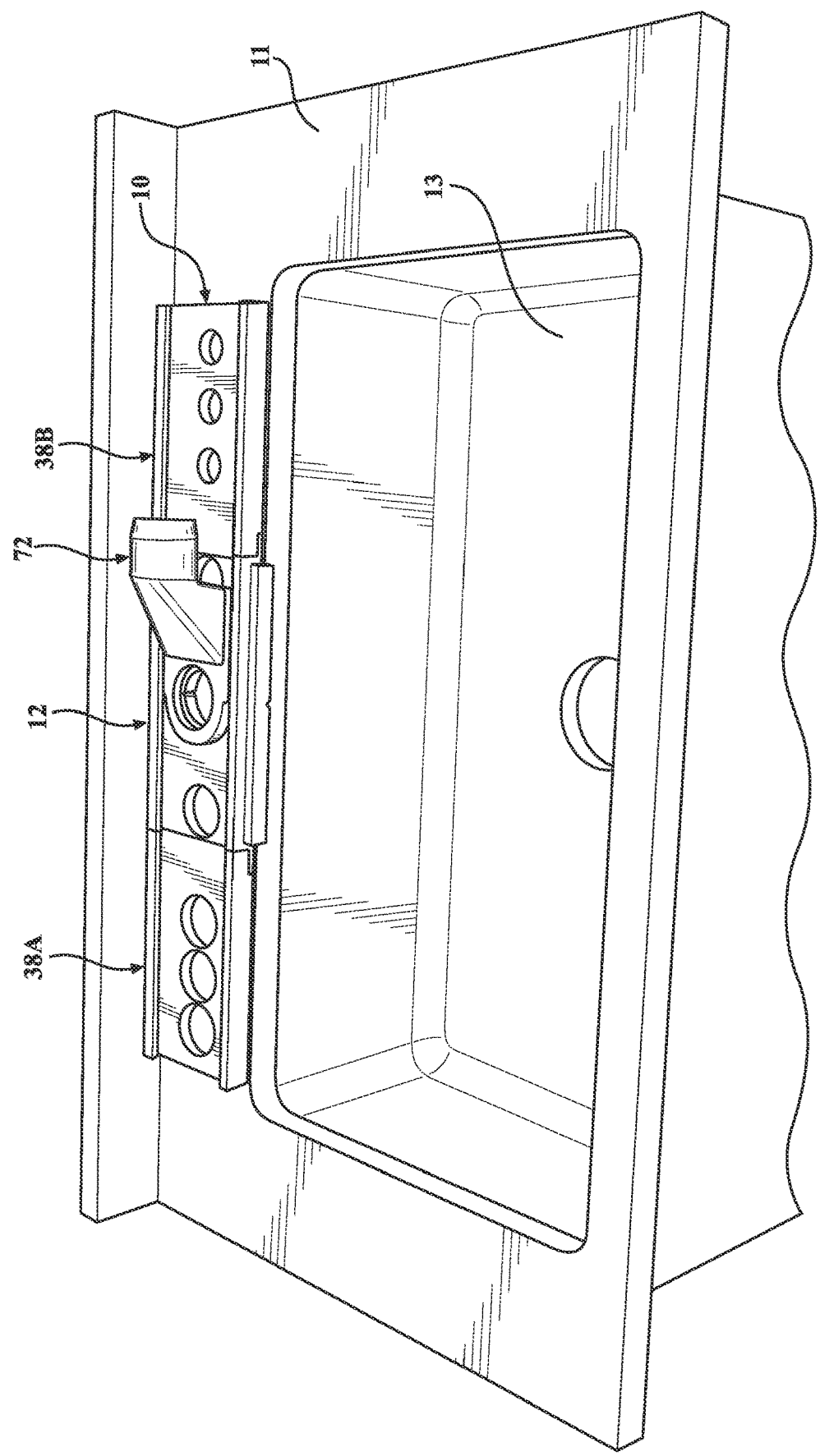
FIG. 1 is a perspective view of an embodiment of a template positioned on a countertop adjacent to a sink.
Figure 2:
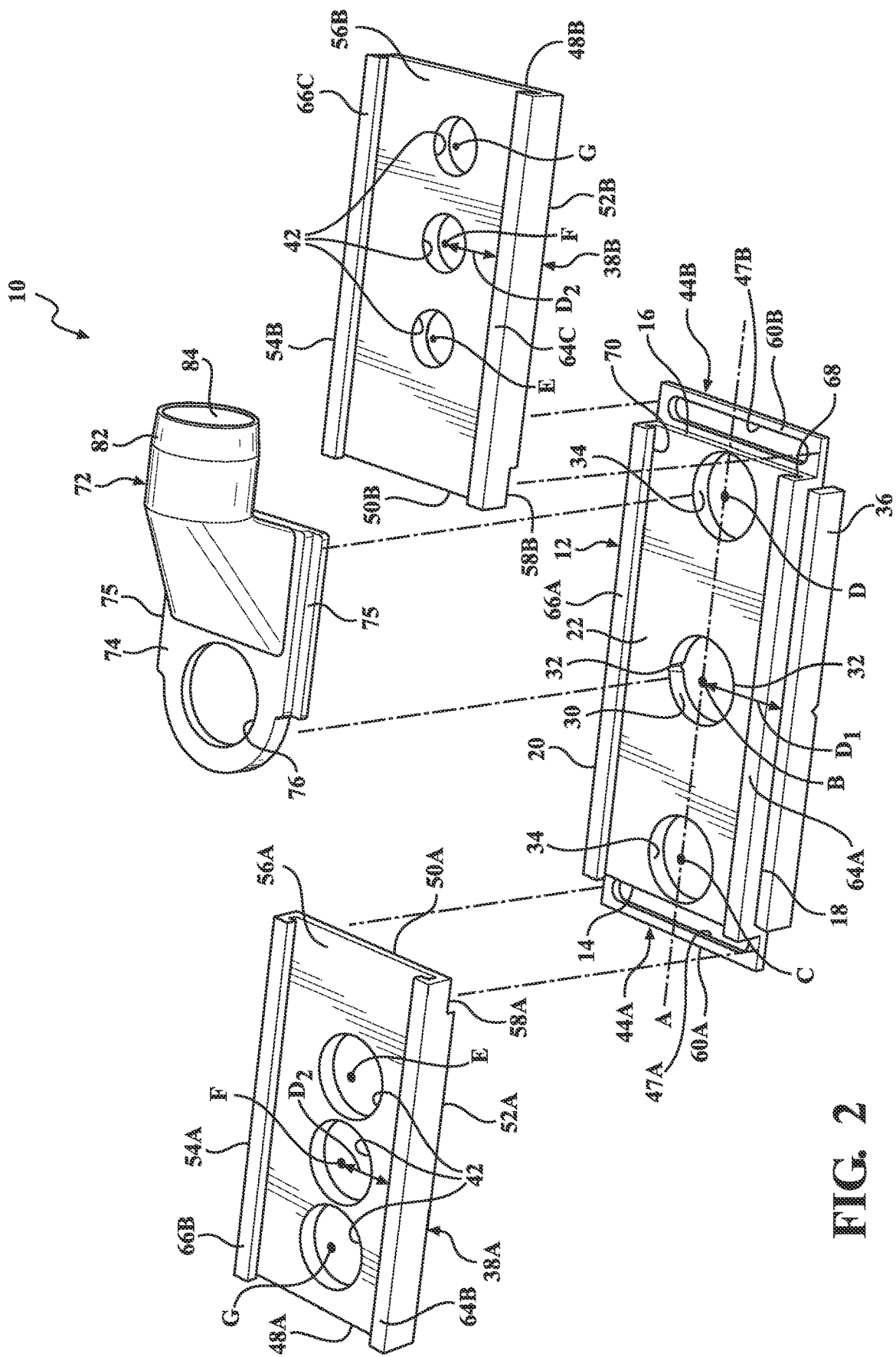
FIG. 2 is an exploded view of the template of FIG. 1.
Figure 3:
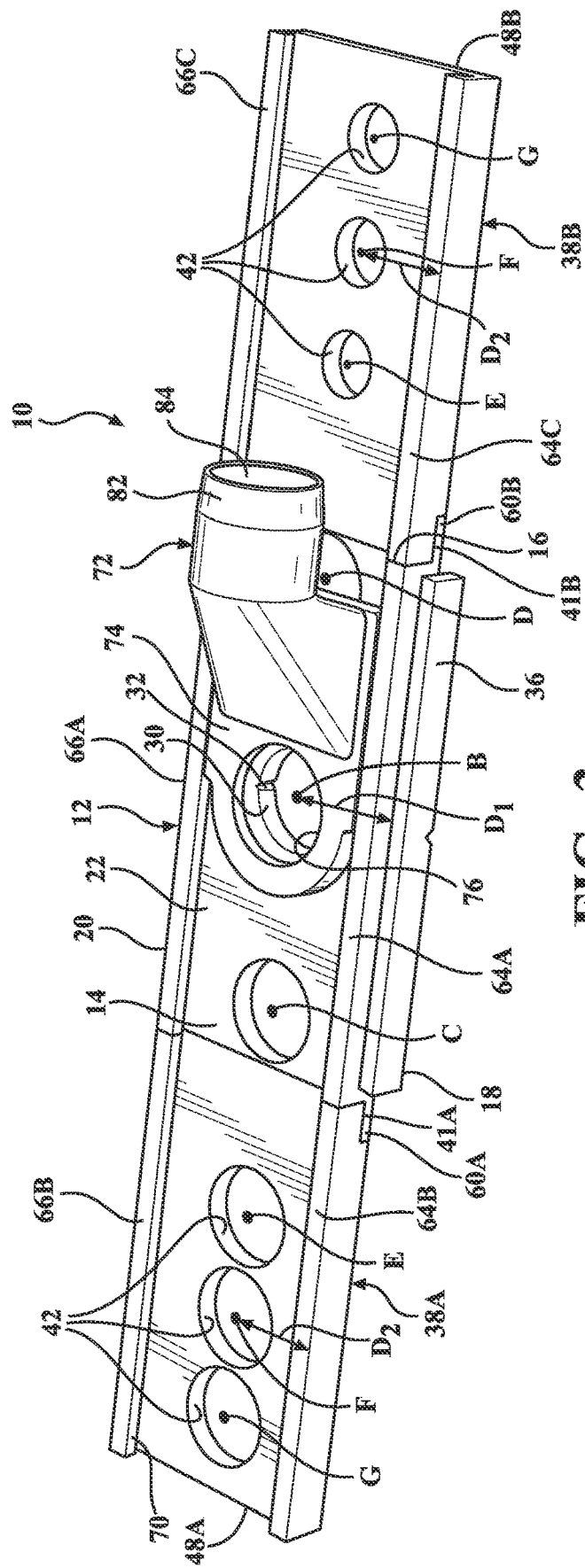
FIG. 3 is a perspective view of the template of FIG. 4.
Figure 4:
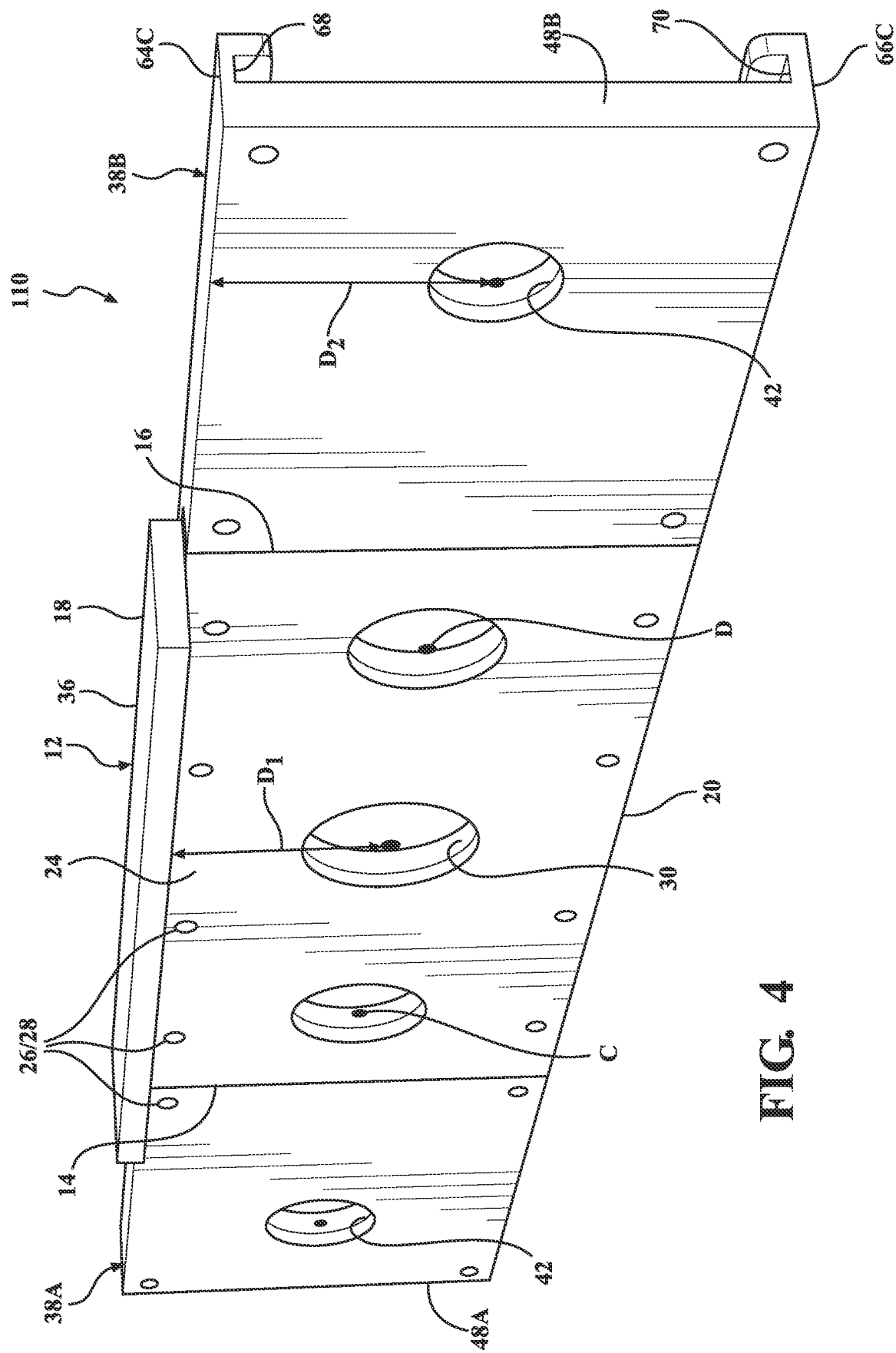
FIG. 4 is a bottom perspective view of a template, illustrating an arrangement of boot orifices and associated rubber boots, and illustrating an alternate arrangement of supplementary guide bores.

As shown in the template 110 arrangement of FIGS. 2-4, the template 10 includes a central plate segment 12 that generally has a rectangular shape and extends along an axis A between a first end 14 and a second end 16, and has a front side 18 and a rear side 20 opposite the front side 18, and a top surface 22 and a bottom surface 24 opposite the top surface 22. As illustrated in FIG. 1, the bottom surface 24 is configured to overlie the countertop 11 during the hole drilling process.

As shown in the template 110 arrangement of FIG. 4 the bottom surface 24 may define a plurality of boot orifices 26 that are spaced relative to one another and located adjacent to the front and rear sides 18, 20. Each of the boot orifices 26 receives a rubber boot 28 for frictionally engaging the countertop 11 during use to inhibit the template 100 from sliding relative to the countertop 11.

With reference back to FIGS. 2-3, the central plate segment 12 further defines a central guide bore 30 for guiding a rotary device, such a drill, during the formation of a hole, such as a faucet hole. The central guide bore 30 is located axially at a center of the central plate segment 12 between the first and second ends 14, 16, and in a middle of the central plate segment 12 in a front-to-back direction between the sides 18, 20. A pair of first center indicators 32 are defined along the central guide bore 30 at the axial center of the central plate segment 12 on diametrically opposite sides of the central guide bore 30 for indicating the axial center of the central plate segment 12 to the user.

The central plate segment 12 further defines a pair of outer guide bores 34 on opposing sides of the central guide bore 30 for guiding the rotary device during the formation of holes, such as faucet handle holes and the like. Like the central guide bore 30, the outer guide bores 34 are centrally located in the front to back direction between the front and rear sides 18, 20. A center C, D of each of the outer guide bores 34 is axially spaced from a center B of the central guide bore 30 by four inches to provide standard "8 inch widespread" spacing between the faucet and handles after assembly. Other distances could be employed based on specific needs, and additional outer guide bores could be provided. For example, "4 inch centerset spacing" could be provided by spacing the outer guide bores 34 by two inches on each side.

A drop flange 36 extends downwardly from, and axially along the front side 18 of the central plate segment 12. According to the example embodiment, the drop flange 36 extends along substantially an entire axial length of the front side 18, but could extend at other lengths. The drop flange 36 is configured to be positioned against an edge of the countertop 11 in the sink 13 (e.g., as shown in FIG. 1) in order to allow holes to be drilled through the countertop 11 at a predetermined distance from the sink 13. According to the example embodiment, centers B, C, D of the guide bores 30, 34 are spaced from the drop flange 36, and thus also the edge of the countertop 11 in the sink 13 by a first distance $D_1$ of 2⅜ of an inch in the front-to-back direction to provide sufficient spacing of the faucet and other accessories from the sink 13. It should be appreciated that 2⅜ of an inch is a standard dimension which typically provides sufficient room for flanges of sinks (usually around 1" around the hole), and sufficient room for mounting hardware for the faucet on a bottom of the sink. Other distances could be used based on specific needs. According to the example embodiment, the drop flange 36 is permanently fixed to the central plate segment 12, however it could alternatively be detachably connected to the central plate segment 12 such that drop flanges 36 with different dimensions may be substituted in order to provide different hole spacings in the front-to-back direction. Various fastening mechanisms could be used to connect the drop flange 36 to the central plate segment 12 including, but not limited to, bolts, screws and adhesives.

First and second supplemental plate segments 38A, 38B are removably coupled to the first and second ends 14, 16 of the central plate segment 12. The first and second supplemental plate segments 38A, 38B each include one or more supplementary guide bores 42 for guiding the rotary device during the formation of additional holes. Again, the additional holes may be used for various faucet assembly accessories including, but not limited to soap dispensers and drinking water dispensers. According to the example embodiment shown in FIGS. 1-3, each of the supplemental plate segments 38A, 38B has three supplemental guide bores 42, but more or fewer could be included. For example, FIG. 4 illustrates an arrangement in which each of the supplemental plate segments 138A, 138B has one supplemental guide bore 42. The centers E, F, G of the supplemental guide bores 42 are each centrally located on the supplemental plate segments 38A, 38B, 138A, 138B in the front-to-back direction. According to the example embodiments, like the central and outer guide bores 30, 34 this renders the supplemental guide bores 42 spaced from the drop flange 36/edge of the countertop 11 in the sink 13 by a second distance $D_2$ of 2⅜ of an inch. Other distances could be employed based on specific applications. According to the example embodiment of FIGS. 1-3, centers E, F, G of each the supplemental guide bores 42 are spaced axially from a center B of the central guide bore 30 (and the center of the central plate 8) by 8, 10 and 12 inches, respectively, but other distances could be used based on specific needs.

As best shown in FIG. 2, the first supplemental plate segment 38A is coupled to the first end 14 of the central plate segment 12 with a first coupling mechanism 44A, and the second supplemental plate segment 38B is coupled to the second end 16 of the central plate segment 12 with a second coupling mechanism 44B. The first and second supplemental plate segments 38A, 38B each include a first end 48A, 48B and a second end 50A, 50B, and have a front side 52A, 52B and a rear side 54A, 54B opposite the front side 52A, 52B, and a top surface 56A, 56B and a bottom surface 58A, 58B opposite the top surface 56A, 56B. Like the central plate segment 12, the bottom surfaces 58A, 58B of the supplemental plate segments 38A, 38B are configured to overlie the countertop 11.

Figure 7:
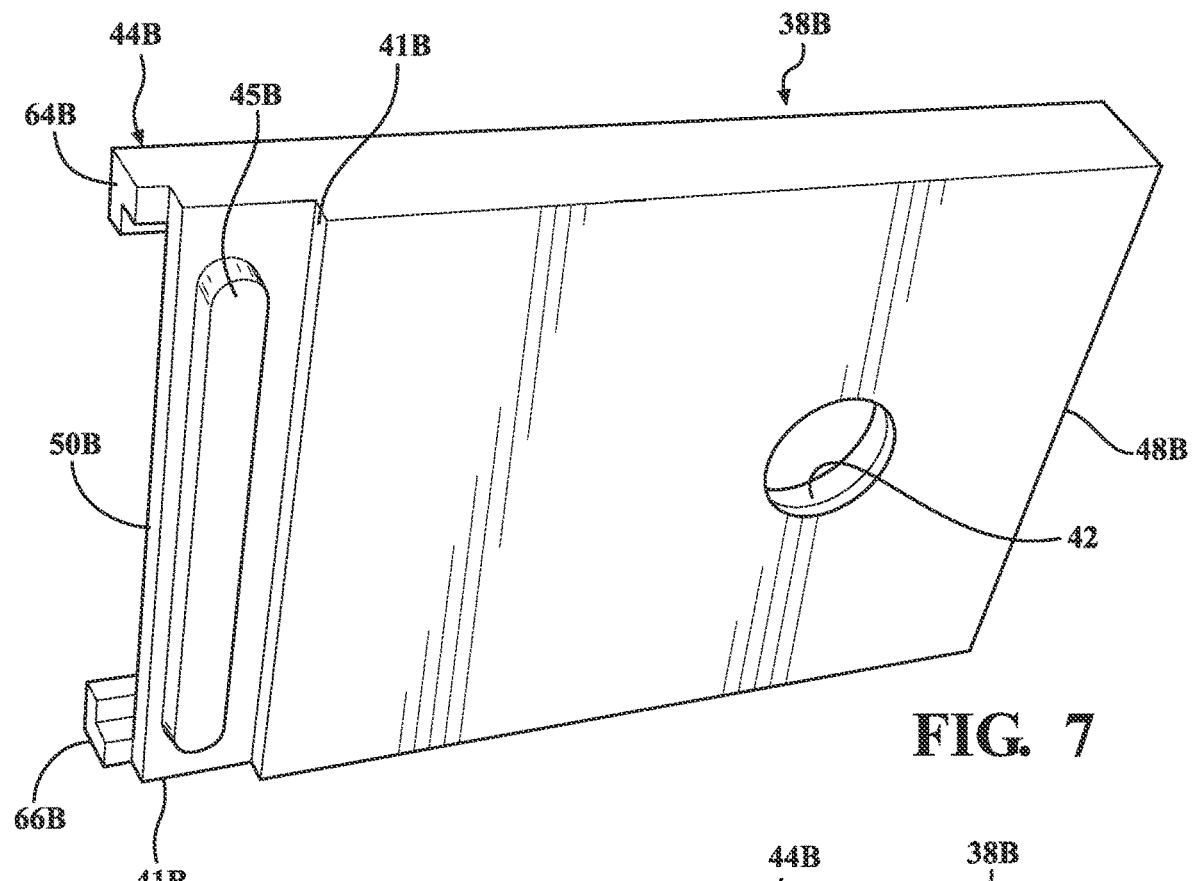
FIG. 7 is a perspective view of a supplemental plate segment of a template, illustrating a fixing flange of a coupling mechanism.
Figure 8:
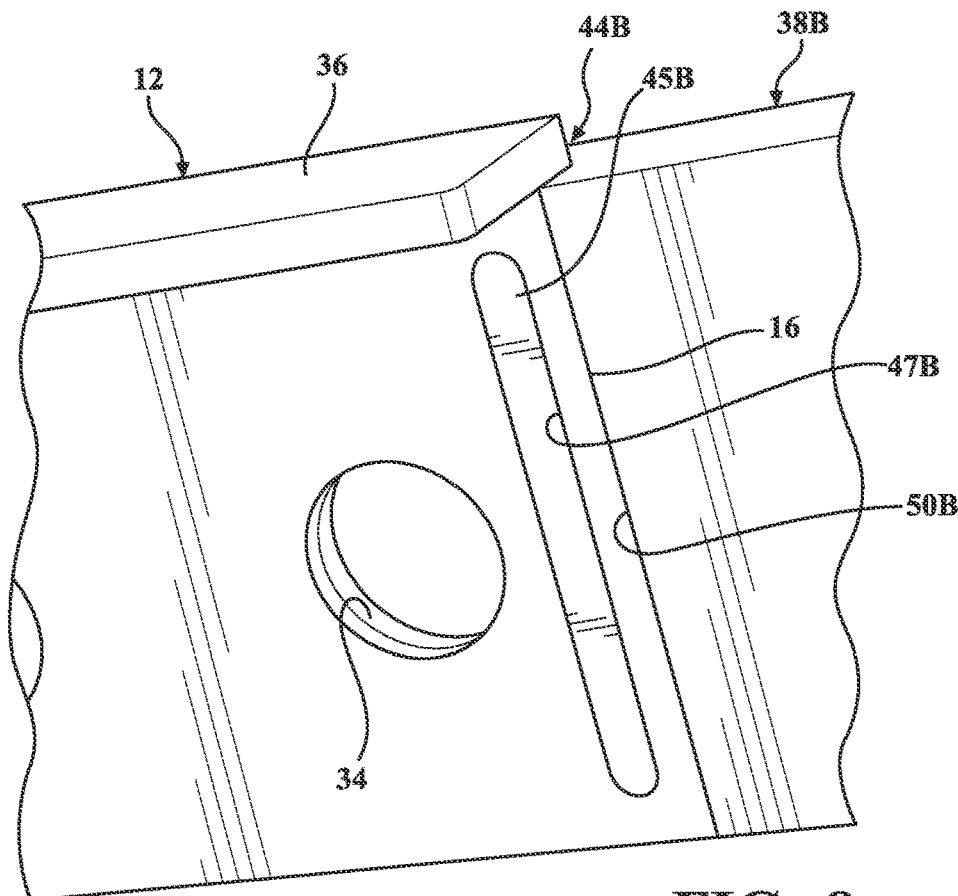
FIG. 8 is a perspective view of a central plate segment and the supplemental plate segment of FIG. 7, illustrating the fixing flange of the coupling mechanism received in a fixing slot of the supplemental plate segment.

The first coupling mechanism 44A includes a first tongue 60A that extends axially from the first end 14 of the central plate segment 12, and a first groove portion 41A that is defined by the second end 50A of the first supplemental plate segment 38A, 38B. The first groove portion 41A is configured to receive the first tongue 60A, with the central plate segment 12 and the first supplemental plate segment 38A positioned axially in end-to-end relationship with one another. Likewise, the second coupling mechanism 44B includes a second tongue 60B that extends axially from the second end 16 of the central plate segment 12, and a second groove portion 41B that is defined by the first end 48B of the second supplemental plate segment 38B. The second groove portion 41B is configured to receive the second tongue 60B with the central plate segment 12 and second supplemental plate segment 38B located axially in end-to-end relationship with one another. As shown in FIGS. 7 and 8, each of the coupling mechanisms 44A, 44B may further include a fixing flange 45A, 45B extending downwardly from the groove portion 41A, 41B of the supplemental plate segment 38A, 38B and an associated fixing slot 47A, 47B along the tongue 60A, 60B of the central plate segment 12, with each of the fixing flanges 45A, 45B configured to be received in one of the fixing slots 47A, 47B in order to inhibit axial movement of the supplemental plate segment 38A-B relative to the central plate segment 12 while providing flush top surfaces of the central plate segment 12 and supplemental plate segments 38A, 38B. This arrangement of coupling mechanisms 44A, 44B allows the central and supplemental plate segments 12, 38A, 38B to quickly and efficiently be connected to one another while providing a reliable connection. It should be appreciated that the tongues 60A, 60B could alternatively be located on the supplemental plate segments 38A, 38B and the groove portions 41A, 41B on the central plate segment 12. Likewise the fixing flanges 45A, 45B could be located on the central plate segment 12 and the fixing slots 47A, 47B could be located on the supplemental plate segments 38A, 38B. It should also be appreciated that the coupling mechanisms 44A, 44B could include other styles of fastening mechanisms for temporarily fixing the central and supplemental plate segments 12, 38A, 38B to one another.

With reference to FIGS. 2-3, an elongated front rail 64A-C extends axially along the front sides 18, 52A, 52B of the central plate segment 12 and the first and second supplemental plate segments 38A, 38B on the top surfaces 22, 56A, 56B. The front rail 64A-C is comprised of a central portion 64A on the central plate segment 12, and two supplemental portions 64B, 64C on the supplemental plate segments 38A, 38B. The central and supplemental portions 64A-64C are configured to be positioned in end-to-end relationship with one another when the central and supplemental plate segments 12, 38A, 38B of the template 10 are connected to one another to define a single elongated front rail 64A-C.

Similar to the front rail 64A-B, an elongated rear rail 66A-C extends axially along the rear sides 20, 54A, 54B of the central plate segment 12 and the first and second supplemental plate segments 38A, 38B on the top surfaces 22, 56A-B. The rear rail 66A-C is comprised of a central portion 66A on the central plate segment 12, and two supplemental portions 66B, 66C on the supplemental plate segments 38A, 38B. The central and supplemental portions 66A-C are configured to be positioned in end to end relationship with one another when the central and supplemental plate segments 12, 38A, 38B of the template 10 are connected to one another to define a single elongated rear rail 66A-C.

The front and rear rails 64A-C, 66A-C each generally have an L-shaped cross section to define a front channel 68 between the front rail 64A-C and the top surfaces 22, 56A-B, and a rear channel 70 between the rear rail 66A-C and the top surface 22, 56A-B. The rails could have other shapes to form the channels 68, 70.

Figure 6:
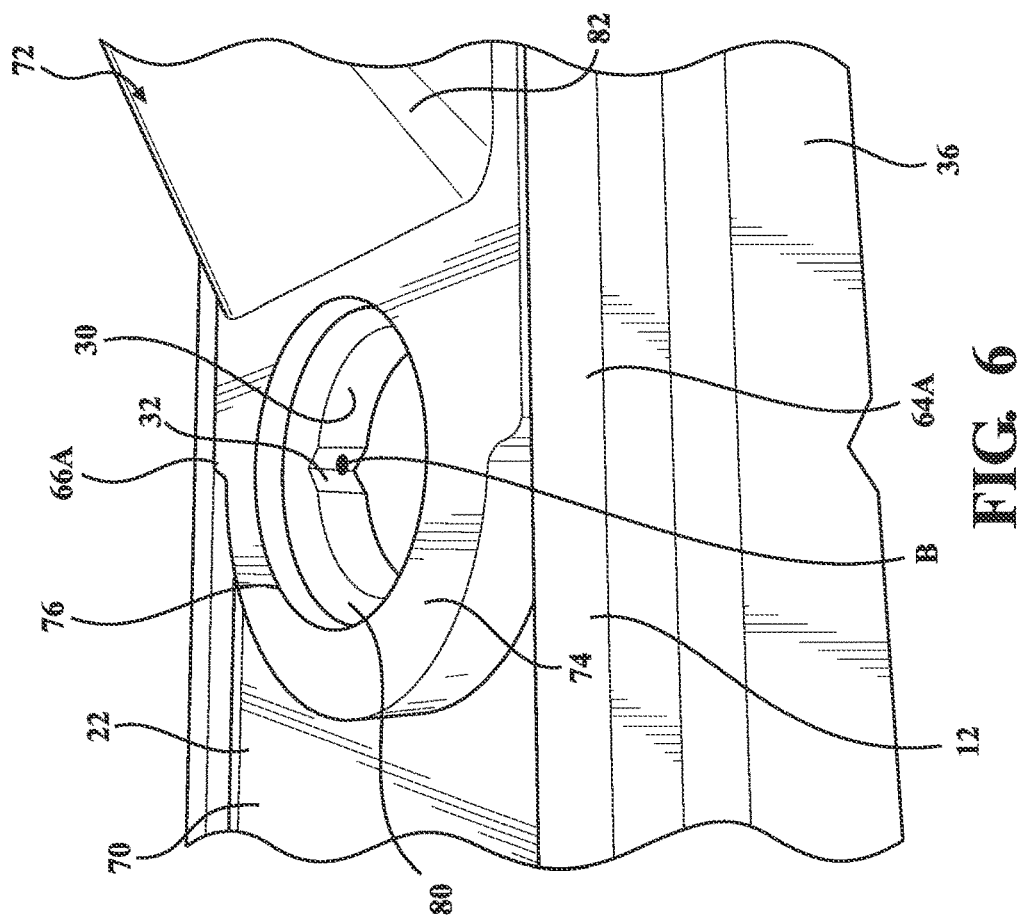
FIG. 6 is a perspective view of the vacuum attachment coupled with a central plate of a template.
Figure 5:
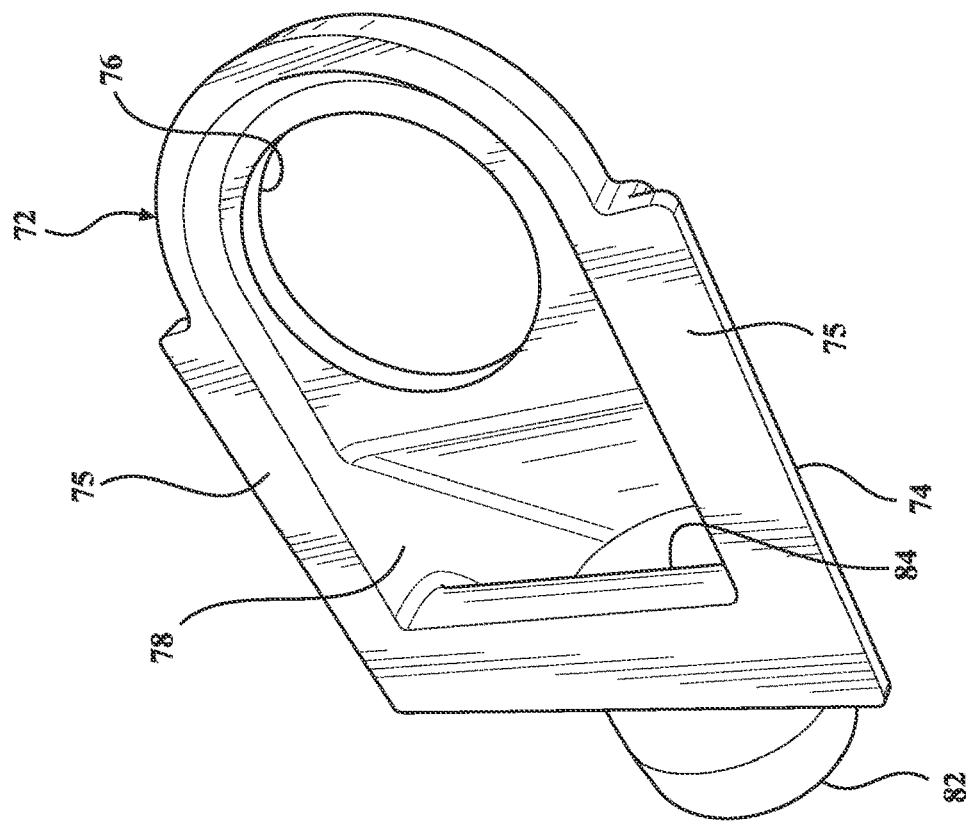
FIG. 5 is a bottom perspective view of a vacuum attachment for a template.

A vacuum attachment 72 is configured to selectively overlie the top surfaces 22, 56A, 56B of the central and supplemental plate segments 12, 38A, 38B for removing debris during drilling through the guide bores 30, 34, 42. The vacuum attachment 72 includes a base portion 74 that is configured to overlie the top surfaces 22, 56A, 56B. The base portion 74 defines an alignment hole 76 for overlying the guide bores 30, 34, 42. The base portion 74 defines a hollow 78 (best shown in FIG. 5) that defines a passage 80 (best shown in FIG. 6) between the base portion 74 and the top surfaces 22, 56A, 56B of the plate segments 12, 38A, 38B when the vacuum attachment 72 is connected to the plate segments 12, 38A, 38B. Edges 75 of the base portion 74 are received by the channels 68, 70 of the front and rear rails 64A-C, 66A-C which renders the vacuum attachment 72 axially slideable along the top surfaces 22, 56A, 56B of the central and supplemental plate segments 12, 38A, 38B while inhibiting lateral and upward movement of the vacuum attachment 72. The vacuum attachment 72 may be received or remove from the template 10 at any of the ends of the central and supplementary plate segments 12, 38A, 38B. The vacuum attachment 72 further includes a connection portion 82 that is configured to connect to a hose of a vacuum. The connection portion 82 defines a passageway 84 that is fluidly connected to the channel passage 80 of the base portion 74 for receiving debris received through the passage 80 of the base portion 74. Because the vacuum attachment 72 is axially slideable, its alignment hole 76 can easily be moved to any of the guide bores 30, 34, 42 as needed.

As presented in FIG. 9, the present disclosure further provides for a method of using the template 10 to drill holes in the countertop 11. The method includes 100 positioning the bottom surface 24 of at least the central plate segment 12 against the countertop 11. The method further includes 102 positioning the drop flange 36 against an edge of the countertop 11 in the sink 13 such that a center of at least one of the guide bores 30, 34, 42 overlies the countertop 11 at a distance of 2⅜ of an inch from the edge of the countertop 11 in the sink 13. The method further includes 104 sliding the vacuum attachment 72 such that the alignment hole 76 of the vacuum attachment 72 is concentric with one of the guide bores 30, 34, 42. The method further includes 106 drilling a hole in the countertop 11 with the rotary tool through the alignment hole 76 and the guide bore 30, 34, 42 which the alignment hole 76 is concentric with. The method also includes 108 sucking debris through the passage 80 of the vacuum attachment 72 while drilling the hole. It should be appreciated that the method could also be performed without the vacuum attachment 72. It should further be appreciated that the method may be executed for drilling holes using any of the guide bores 30, 34, 42 of the central plate segment 12 and supplementary plate segments 38A, 38B.

As shown in the template 210 arrangement of FIGS. 11-13, the template 210 may further include an arrangement of biasing elements 86A-B, 88A-B, 90A-B which bias the vacuum attachment 72 at predetermined locations along the central and supplemental plate segment 12, 38A, 38B. The predetermined locations are selected at locations at which the alignment hole 76 of the vacuum attachment 72 is concentric with the guide bores 30, 38A, 38B to permit an operator to easily self-align the vacuum attachment 72 at the guide bores 30, 38A, 38B. More particularly, the biasing elements 86A-B, 88A-B, 90A-B bias the vacuum attachment 72 in the predetermined locations but permit the vacuum attachment 72 to be slid into the other predetermined locations upon the application of a sufficient force by the operator. According to the example embodiment and as discussed in further detail below, the biasing elements 86A-B, 88A-B, 90A-B are comprised of an arrangement of magnets 86A-B, 88A-B, 90A-B that are embedded into the bottom surfaces 24, 58A, 58B of the central and supplemental plate segments 12, 38A, 38B and the vacuum attachment 72. More particularly, the central and supplemental plate segments 12, 38A, 38B each include an arrangement of plate magnets 86A, 86B, 88A, 88B, and the vacuum attachment includes an arrangement of attachment magnets 90A, 90B. Other suitable biasing elements could be used like a ratcheting system or series of springs/rubber bands.

As shown in FIGS. 11 and 13, the plate magnets 86A, 86B on the central plate segment 12 includes a first row of central plate magnets 86A and a second row of central plate magnets 86B. The magnets 86A, 86B of each of the first and second rows of plate magnets 86A, 86B are each aligned with one another in the axial direction and spaced axially from one another by a third distance $D_3$. Furthermore, the first and second rows of central plate magnets 86A, 86B are arranged in parallel relationship with one another and are spaced by a fourth distance $D_4$ in a width direction that is perpendicular to the axis.

As best shown in FIG. 13, like the central plate segment 12, each of the supplemental plate segments 38A, 38B includes a first row of supplemental magnets 88A and a second row of supplemental magnets 88B. The magnets 88A, 88B of the first and second rows of supplemental magnets 88A, 88B are aligned with one another in the axial direction and spaced axially from one another by the third distance $D_3$. Furthermore, the first and second rows of supplemental magnets 88A, 88B are arranged in parallel relationship with one another and are spaced by the fourth distance $D_4$ in the width direction.

With reference to FIG. 12, like the plate and supplemental magnets 86A, 86B, 88A, 88B, the attachment magnets 90A, 90B includes a first row of attachment magnets 90A and a second row of attachment magnets 90B. The magnets 90A, 90B of the first and second rows of attachment magnets 90A, 90B are aligned with one another in the axial direction and are spaced axially from one another by the third distance $D_3$. Furthermore the first and second rows of attachment magnets 90A, 90B are arranged in parallel relationship with one another and are spaced by the fourth distance $D_4$ in the width direction.

Because the rows of magnets 86A, 86B, 88A, 88B, 90A, 90B on the plates 12, 38A, 38B and vacuum attachment 72 are spaced from one another by the same distances $D_3$, $D_4$ in the axial and width directions, the magnets 90A, 90B of the vacuum attachment 72 directly overlie the magnets 86A, 86B, 88A, 88B of the plates 12, 38A, 38B as the vacuum attachment 72 is slid/moved along the plates 12, 38A, 38B to the predetermined locations to provide the biasing effect.

As presented in FIG. 10, as an alternative to the rubber boots 28 previously described, the bottom surfaces 24, 58A, 58B of the central and supplementary plate segments 212, 238A, 238B each may be covered by a mat 92 of a high friction material such as a rubber or silicon to inhibit movement of the template 10 during use. The mat 92 may be located along all, substantially an entirety of, or a portion of the bottom surfaces of the central and supplementary plate segments 212, 238A, 238B. The mat 92 overlies the magnets 86A, 86B, 88A, 88B and thus contributes to holding the magnets 86A, 86B, 88A, 88B in place. The mat 92 could be used in conjunction with rubber boots 28, e.g., portions of the plates 12, 38A, 38B could include rubber boots 28 while other portions include a mat 92.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in that particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or later, or intervening element or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to described various elements, components, regions, layers and/or plate segments, these elements, components, regions, layers and/or plate segments should not be limited by these terms. These terms may be only used to distinguish one element, component, region, layer or plate segment from another region, layer or plate segment. Terms such as "first," "second," and other numerical terms when used herein do not imply a sequence or order unless clearly indicated by the context. Thus, a first element, component, region, layer or plate segment discussed below could be termed a second element, component, region, layer or plate segment without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A template for assisting in drilling holes in a countertop adjacent to a sink during a water faucet assembly installation process, comprising:
    at least one plate segment extending along an axis and having a front side and a rear side opposite the front side, and a top surface and a bottom surface opposite the top surface, wherein the bottom surface is configured to overlie the countertop;
    the top surface of the at least one plate segment defining at least one guide bore for guiding a rotary device during the formation of a hole in the countertop; and
    a drop flange extending downwardly from the front side of the at least one plate segment for engaging an edge of the countertop in the sink, the drop flange spaced from a center of the at least one guide bore in a front-to-back direction between the sides by a first distance in order to allow the hole to be drilled through the countertop along the at least one guide bore by the first distance away from the edge of the countertop in the sink.

2. The template as set forth in claim 1, wherein the first distance is 2⅜ of an inch.

3. The template as set forth in claim 1, wherein the at least one guide bore includes a plurality of guide bores positioned in spaced and axially aligned relationship with one another.

4. The template as set forth in claim 3, wherein the plurality of guide bores includes a central guide bore and a pair of outer guide bores disposed on axially opposing sides of the central guide bore.

5. The template as set forth in claim 4, wherein a center of each of the outer guide bores is spaced axially from a center of the central guide bore by four inches.

6. The template as set forth in claim 1, wherein the drop flange extends along substantially an entire axial length of the at least one plate segment.

7. The template as set forth in claim 1, wherein the at least one plate segment includes a central plate segment extending axially between a first end and a second end, and wherein the at least one plate segment further includes at least one supplemental plate segment being connectable to at least one of the first and second ends of the central plate segment.

8. The template as set forth in claim 7, wherein the at least one supplemental plate segment includes a first supplemental plate segment connected to the first end of the central plate segment, and a second supplemental plate segment connected to the second end of the central plate segment.

9. The template as set forth in claim 7, wherein the at least one guide bore includes at least one guide bore on the central plate segment and at least one guide bore on the at least one supplemental plate segment.

10. The template as set forth in claim 9, wherein the at least one guide bore includes a plurality of guide bores on the central plate segment and a plurality of guide bores on the at least one supplemental plate segment.

11. The template as set forth in claim 7, further including a coupling mechanism connecting the central plate and the at least one supplemental plate segment, the coupling mechanism including a tongue extending axially from one of the first and second ends of the central plate, and a groove defined by an end of the at least one supplemental plate segment, wherein the groove is configured to receive the tongue with the central plate and the supplemental plate segment configured in end-to-end relationship with one another.

12. The template as set forth in claim 11, wherein the coupling mechanism further includes a fixing flange extending from the bottom surface of the central plate, and a fixing slot defined by the tongue of the central plate, wherein the fixing flange is configured to be received in the fixing slot in order to inhibit axial movement of the supplemental plate segment relative to the central plate segment.

13. The template as set forth in claim 1, further including a vacuum attachment slideable along the at least one plate segment for removing debris during drilling through the at least one guide bore.

14. The template as set forth in claim 13, wherein a front rail protrudes from the top surface of the at least one plate segments along the front side of the at least one plate segment, wherein a rear rail protrudes from the top surface of the at least one plate segment along the rear side of the at least one plate segment to define a channel on the top surface of the at least one plate segment, and wherein the vacuum attachment is received in the channel and slideable along the top surface of the at least one plate segment.

15. The template as set forth in claim 14, wherein the at least one guide bore includes a plurality of guide bores, and wherein the vacuum attachment defines an alignment hole for overlying the guide bores and a passage that terminates at the guide bore for receiving debris as the hole in the countertop is drilled.

16. The template as set forth in claim 13, wherein at least one biasing element biases the vacuum attachment into alignment with the at least at least one guide bore of the plate.

17. The template as set forth in claim 16, wherein the at least one guide bore includes a plurality of guide bores, wherein the at least one biasing element includes a plurality of biasing elements, and wherein the plurality of biasing elements are configured to bias the vacuum attachment into alignment with each of the plurality of guide bores.

18. A method for drilling at least one hole in a countertop adjacent to a sink during a water faucet assembly installation process, comprising:

providing at least one plate segment extending along an axis and having a front side and a rear side opposite the front side, and a top surface and a bottom surface opposite the top surface, wherein the top surface of the at least one plate segment defines at least one guide bore, and wherein a drop flange extends downwardly from the front side, the drop flange spaced from a center of the at least one guide bore in a front-to-back direction between the sides by a first distance;

positioning the bottom surface of the at least one plate segment over the countertop;

positioning the drop flange against an edge of the countertop in the sink such that a center of the at least one guide bore overlies the countertop by the first distance from the edge of the countertop in the sink; and drilling a hole through the countertop with a rotary tool through the at least one guide bore.

19. The method as set forth in claim 18, wherein the first distance is 2⅜ of an inch.

20. The method as set forth in claim 18, further including sliding a vacuum attachment along the at least one plate segment into alignment with the at least one guide bore, and removing debris from adjacent to the guide bore with a vacuum through the vacuum attachment.

* * * * *